United States Patent [19]

Melchior

[11] Patent Number: 5,199,402
[45] Date of Patent: Apr. 6, 1993

[54] DEVICE FOR INJECTING LIQUID SUCH AS FUEL INTO AT LEAST ONE PRESSURIZED CHAMBER OF A PERIODIC OPERATION MACHINE SUCH AS AN INTERNAL COMBUSTION ENGINE AND ENGINE OF THIS TYPE EQUIPPED WITH THIS DEVICE

[76] Inventor: Jean F. Melchior, 126 Bld Montparnasse, 75 014 Paris, France

[21] Appl. No.: 836,507

[22] Filed: Feb. 18, 1992

[30] Foreign Application Priority Data

Feb. 25, 1991 [FR] France ................... 91 02208

[51] Int. Cl.$^5$ ................................ F02M 7/00
[52] U.S. Cl. ..................... 123/447; 123/514
[58] Field of Search ............... 123/447, 514, 506, 456, 123/446, 467

[56] References Cited

U.S. PATENT DOCUMENTS

| | | |
|---|---|---|
| 3,997,117 | 12/1976 | Kohler et al. . |
| 4,089,315 | 5/1978 | Lakra . |
| 4,167,168 | 9/1979 | Yamamoto . |
| 4,261,513 | 4/1981 | Andrews . |
| 4,372,272 | 2/1983 | Walter .................... 123/447 |
| 4,417,557 | 11/1983 | Walter .................... 123/447 |
| 4,459,959 | 7/1984 | Terada .................... 123/447 |
| 4,485,789 | 12/1984 | Walter .................... 123/447 |
| 4,572,433 | 2/1986 | Deckard . |
| 4,612,893 | 9/1986 | Ishibashi ................. 123/506 |
| 4,633,836 | 1/1987 | Faupel .................... 123/447 |
| 4,665,881 | 5/1987 | Wade ..................... 123/447 |
| 4,684,067 | 8/1987 | Cotter et al. . |
| 4,712,528 | 12/1987 | Schaffitz ................. 123/447 |
| 4,838,231 | 6/1989 | Ganser .................... 123/447 |
| 4,852,808 | 8/1989 | Yamamoto . |

Primary Examiner—Carl S. Miller
Attorney, Agent, or Firm—Larson and Taylor

[57] ABSTRACT

In a device for injecting liquid such as fuel into at least one pressurized chamber of a periodic operation machine such as an internal combustion engine the needle of an injector is alternately separated from its seat by the liquid pressure established by a piston pump and returned towards its seat by a liquid pressure operating on its surface remote from its conical part. This latter liquid pressure is established by connection with the cylinder of the piston pump through a calibrated orifice and a one-way valve connected in series.

28 Claims, 5 Drawing Sheets

DEVICE FOR INJECTING LIQUID SUCH AS FUEL INTO AT LEAST ONE PRESSURIZED CHAMBER OF A PERIODIC OPERATION MACHINE SUCH AS AN INTERNAL COMBUSTION ENGINE AND ENGINE OF THIS TYPE EQUIPPED WITH THIS DEVICE

BACKGROUND OF THE INVENTION

1. Field of the Invention

In one aspect, the invention concerns a device for injecting liquid into at least one chamber pressurized by a gas and forming part of a periodic operation machine such as an internal combustion engine, the device comprising a unit for pressurizing the liquid to be injected formed by a variable volume first cavity delimited by a piston reciprocating inside a cylinder, which first cavity communicates with low-pressure liquid reserve means through the intermediary of a control unit establishing such communication cyclically in synchronism with the periodic operation of said machine and via a passage that is open at all times, except for the presence of a re-aspiration valve or like unit, with an injector formed by a nozzle and a mobile needle which is a body of revolution, which nozzle comprises a second cavity connected to said passage and delimited laterally by a circular cylindrical wall and axially by a partially conical wall forming a seat and coaxial with said cylindrical wall and at least one injector orifice discharging into said pressurized chamber, which needle has a cylindrical part forming a piston and adapted to slide with minimal operating clearance inside said cylindrical wall of the nozzle and a conical part cooperating with said seat, which needle is adapted to be held when idle in bearing engagement with the seat by return means so as to interrupt communication between the second cavity and the injector orifice(s) and so that its cross-section bearing on the seat, when projected onto a plane perpendicular to the axis of the needle, is less than the transverse cross-section of the cylindrical part of the needle forming the piston, the free surface of the cylindrical part of the needle forming the piston delimiting a variable volume third cavity which communicates with a pressurized accumulator of said liquid and thereby constitutes said return means.

The invention is more particularly, but not exclusively, concerned with devices for injecting liquid fuel for internal combustion engines, said pressurized chamber being then formed by the or each working or combustion chamber of the engine.

2. Description of the Prior Art

An injector device of the type defined above is described in FR-A-2.326.588. In this case the piston of the pressurizing unit is caused to reciprocate by a free piston of which one transverse surface is exposed at all times to atmospheric pressure while its other transverse surface is alternately subjected, by the operation of two valves, to the liquid pressure in the accumulator and to atmospheric pressure. Without modifying the operation of the prior art device, the above piston could also be reciprocated by a rotary cam and spring return means system.

Irrespective of how the piston of the pressurizing unit is caused to move, said needle is alternately lifted off its seat by the pressure of the liquid in said second cavity operating on the differential cross-section of the needle against the action of the pressure of the liquid in the accumulator operating in the third cavity and on the full cross-section of the needle and then returned to its seat by this latter pressure after the pressure of the liquid in the second cavity is reduced. The reciprocating motion of the needle in operation is therefore generated entirely by hydraulic means.

In this prior art device the quantity of fuel injected in each cycle is determined by the length of the return stroke of the free piston during the previous cycle, which is determined by the times at which said valves open and close. However, the conditions under which these valves are operated are not known. It should additionally be noted that the prior art device requires, in addition to a liquid discharge at atmospheric pressure, three liquid sources at different pressures, namely said pressurizing unit (600 bars), a high-pressure liquid source (300 bars) to feed the accumulator and a relatively low-pressure liquid source (10 bars) which has multiple functions.

An object of the invention is to adapt the injector device so that the quantity of liquid dispensed in each cycle can be adjusted in a simple manner. Another object is to simplify the prior art design by using only a single source of pressurized liquid, whilst retaining the benefit of this design resulting from the absence of a reciprocating return spring for the needle and therefore the drawbacks associated with a spring of this kind. A preferable further object of the invention is to enable adjustment during periodic operation of the machine of the injection pressure in the second cavity according to the pressure in the pressurized chamber so as to maintain optimum conditions of injected liquid entry and atomization.

SUMMARY OF THE INVENTION

The invention consists in a device for injecting liquid into at least one chamber pressurized by a gas and forming part of a periodic operation machine such as an internal combustion engine, the device comprising a unit for pressurizing the liquid to be injected formed by a variable volume first cavity delimited by a piston reciprocating inside a cylinder, which first cavity communicates with low-pressure liquid reserve means through the intermediary of a control unit establishing such communication cyclically in synchronism with the periodic operation of said machine and via a passage that is open at all times, except for the presence of a re-aspiration valve or like unit, with an injector formed by a nozzle and a mobile needle which is a body of revolution, which nozzle comprises a second cavity connected to said passage and delimited laterally by a circular cylindrical wall and axially by a partially conical wall forming a seat and coaxial with said cylindrical wall and at least one injector orifice discharging into said pressurized chamber, which needle has a cylindrical part forming a piston and adapted to slide with minimal operating clearance inside said cylindrical wall of the nozzle and a conical part cooperating with said seat, which needle is adapted to be held when idle in bearing engagement with the seat by return means so as to interrupt communication between the second cavity and the injector orifice(s) and so that its cross-section bearing on the seat, when projected onto a plane perpendicular to the axis of the needle, is less than the transverse cross-section of the cylindrical part of the needle forming the piston, the free surface of the cylindrical part of the needle forming the piston delimiting a variable volume third cavity which communicates with a pressurized accumulator of said liquid and thereby constitutes said return means, wherein the first cavity communicates with the third cavity through a calibrated orifice and a one-way valve connected in series and in that said accumulator communicates with said low-pressure liquid reserve means through a variable cross-section leakage orifice provided with adjustment means adapted to maintain the pressure of the liquid in the accumulator at a substantially constant value for given operating conditions during periodic operation of the machine.

This injector device achieves the stated objects of the invention because it is adjusted by operating on the leakage orifice and because the pressurizer unit defined hereinabove constitutes its only source of liquid under pressure.

When the device in accordance with the invention is used to supply liquid fuel to the variable volume working chambers of an internal combustion engine comprising at least two working chambers (each of which therefore constitutes a pressurized chamber in the sense as defined hereinabove) it is beneficial that the third cavity specific to the injector of each working chamber communicates with a single accumulator of pressurized liquid which communicates with the low-pressure liquid reserve means through a single leakage orifice of variable cross-section and that the passages and communications between the first cavity specific to each injector and, respectively, the injector, the control unit establishing cyclic communication with the low-pressure liquid reserve means, the calibrated orifice and its one-way valve towards the single accumulator are as nearly identical as possible from one injector to another.

It is thereby possible using a single accumulator to adjust the supply to the various working chambers simultaneously without introducing any imbalance between them.

It should be noted that FR-A-2.437.495 describes an injector device similar to that of said FR-A-2.326.588 but without any accumulator.

In another aspect, the invention consists in an internal combustion engine having at least one variable volume working chamber and featuring direct injection of liquid fuel into the working chamber or each working chamber, which engine comprises a device for injecting liquid into at least one chamber pressurized by a gas and forming part of a periodic operation machine such as an internal combustion engine, the device comprising a unit for pressurizing the liquid to be injected formed by a variable volume first cavity delimited by a piston reciprocating inside a cylinder, which first cavity communicates with low-pressure liquid reserve means through the intermediary of a control unit establishing such communication cyclically in synchronism with the periodic operation of said machine and via a passage that is open at all times, except for the presence of a re-aspiration valve or like unit, with an injector formed by a nozzle and a mobile needle which is a body of revolution, which nozzle comprises a second cavity connected to said passage and delimited laterally by a circular cylindrical wall and axially by a partially conical wall forming a seat and coaxial with said cylindrical wall and at least one injector orifice discharging into said pressurized chamber, which needle has a cylindrical part forming a piston and adapted to slide with minimal operating clearance inside said cylindrical wall of the nozzle and a conical part cooperating with said seat, which needle is adapted to be held when idle in bearing engagement with the seat by return means so as to interrupt communication between the second cavity and the injector orifice(s) and so that its cross-section bearing on the seat, when projected onto a plane perpendicular to the axis of the needle, is less than the transverse cross-section of the cylindrical part of the needle forming the piston, the free surface of the cylindrical part of the needle forming the piston delimiting a variable volume third cavity which communicates with a pressurized accumulator of said liquid and thereby constitutes said return means, wherein the first cavity communicates with the third cavity through a calibrated orifice and a one-way valve connected in series and in that said accumulator communicates with said low-pressure liquid reserve means through a variable cross-section leakage orifice provided with adjustment means adapted to maintain the pressure of the liquid in the accumulator at a substantially constant value for given operating conditions during periodic operation of the machine.

The invention will now be described in more detail with reference to the appended diagrammatic drawings.

DETAILED DESCRIPTION OF THE INVENTION

Figure 1:
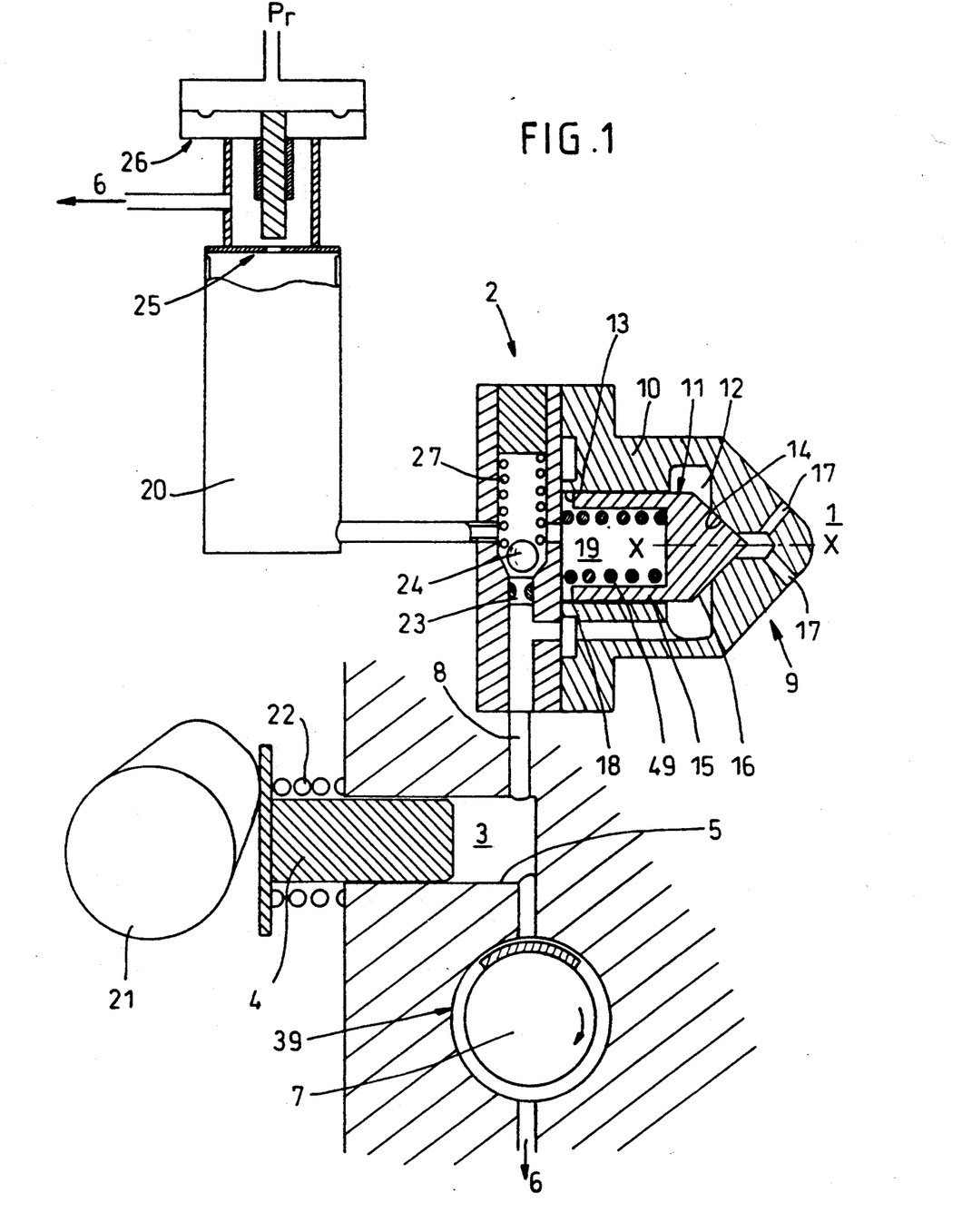
FIGS. 1 and 2 respectively show two different embodiments of the invention.

Referring to FIG. 1, the device to which the invention relates is designed to inject liquid into a chamber 1 pressurized by a gas and forming part of a periodic operation machine 2. This machine is preferably an internal combustion engine and in particular an engine supercharged by a turbocharger (not shown) driven by the exhaust gas of the engine 2, in which case the chamber 1 constitutes the working or combustion chamber of the engine 2 or one such chamber.

The injector device comprises a unit for pressurizing the liquid to be injected formed by a variable volume first cavity 3 delimited by a piston 4 which reciprocates inside a cylinder 5. The first cavity 3 communicates firstly with low-pressure liquid reserve means (reservoir) 6 through a control unit 7 which establishes such communication synchronously with the periodic operation of the machine 2 and secondly through a permanently open passage 8 (except for the presence on this passage of a re-aspiration valve of a known type, as manufactured for example by the German company Robert BOSCH GmbH of Stuttgart) with an injector 9 comprising a nozzle 10 and a mobile needle which is a body of revolution. The nozzle 10 comprises a second cavity 12 connected to the passage 8 and delimited laterally by a circular cylindrical wall 13 and axially by a partially conical wall 14 forming a seat and coaxial with said cylindrical wall 13. The nozzle 10 comprises also at least one injector orifice 17 discharging into the chamber 1.

The needle 11 has a cylindrical part 15 forming a piston adapted to slide with minimal operating clearance inside a cylindrical wall 13 of the nozzle 10 and a conical part 16 cooperating with the seat 14.

The needle 11 is adapted to be held in a rest position in bearing engagement on the seat 14 by return means so as to interrupt communication between the second cavity 12 and the injector orifice(s) 17. The needle 11 is adapted to form a differential piston such that its cross-section bearing on the seat 14, when projected onto a plane perpendicular to the axis X—X of the needle 11, is less than the transverse cross-section of the cylindrical part 15 of the needle 11 forming the piston. Finally, the free surface 18 of the cylindrical part 15, that is to say its surface at the end remote from the conical part 16, delimits a variable volume third cavity 19 which communicates with a pressurized accumulator 20 of said liquid thereby constituting said return means.

The piston 4 can be caused to reciprocate, as shown diagrammatically in FIG. 1, by a rotating cam 21 driven synchronously with the machine 2 against the action of a return spring 22 or by hydraulic means, for example as described in said FR-A-2.326.588, or by any other equivalent means.

Figure 3:
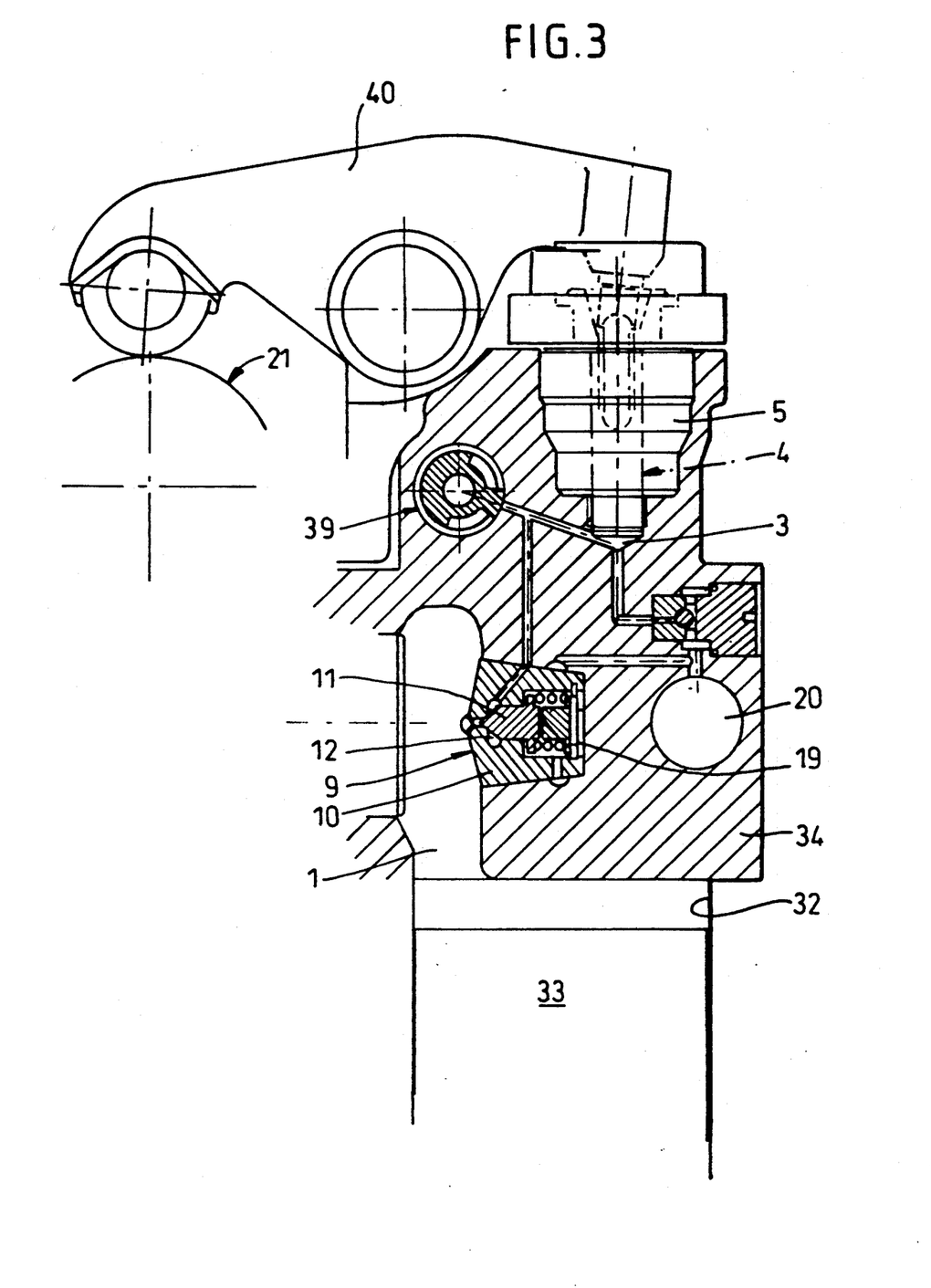
FIGS. 3 and 4 show an internal combustion engine in accordance with the invention respectively in transverse cross-section on a plane containing the axis of one cylinder and in elevation.

The cam 21 can operate on the piston 4 either directly (FIG. 1) or more usually through the intermediary of a rocker arm 40 (FIG. 3).

When the needle 11 is in bearing engagement with its seat 14 it is urged in the closing direction by the pressure in the third cavity 19 which operates on all of the cross-section of its cylindrical part 15 and in the opening direction by the pressure in the second cavity 12 operating on the cross-section equal to the difference between the cross-section of the cylindrical part 15 and the cross-section bearing on the seat 14. During each compression stroke of the piston 4 the pressure communicated via the passage 8 into the second cavity 12 increases until its effect on the needle 11 becomes preponderant and the needle 11 is moved away from its seat 14 allowing some of the pressurized liquid admitted into the second cavity 12 to reach the orifices 17 and to be injected into the chamber 1. When the control unit 7 establishes communication between the first cavity 3 and the low-pressure liquid reserve means 6 the pressure in the second cavity 12 drops and the pressure in the third cavity 19 returns the needle 11 to its seat 14.

This being so, in accordance with the invention the first cavity 3 communicates with the third cavity 19 through a calibrated orifice 23 and a one-way (or nonreturn) valve 24 connected in series and said accumulator 20 communicates with said low-pressure liquid reserve means 6 through a variable cross-section leakage orifice 25 provided with adjustment means 26 adapted to maintain the pressure of the liquid in the accumulator 20 at a substantially constant value for any given operating conditions during periodic operation of the machine 2. Referring to FIG. 1, the one-way valve 24 may comprise a ball acted on by a return spring 27 and is any event adapted to enable the liquid expelled by the piston 4 to reach the third cavity 19 and the accumulator 20 and to prevent it flowing in the opposite direction.

The or each orifice 17 providing communication between the second cavity 12 and the pressurized chamber 1 when the needle 11 is separated from its seat 14 is preferably a cylindrical orifice formed in the nozzle 10 on the downstream side of the seat 14 and, in some embodiments, on the partially conical wall 14.

The means for returning the needle 11 to its seat 14 preferably further comprise a mechanical spring 49 rated to enable operation of the device when the machine 2 is started up at a low frequency when the liquid pressure is not yet established in the accumulator 20.

The adjustment means 26 are preferably responsive to at least one operating parameter Pr of the machine 2 and adapted to control the substantially constant pressure in the accumulator 20 according to this operating parameter. This operating parameter is advantageously a parameter determining the value of the pressure in the chamber 1 at the time the liquid is injected thereinto.

The resulting device is one in which the only source of pressurized liquid is the combination of the piston 4 and the cylinder 5 and which supplies in parallel the second cavity 12 and, through the calibrated orifice 23 and the one-way valve 24, the third cavity 19 and the accumulator 20. The one-way valve 24 maintains the pressure in the accumulator 20 during the suction stroke of the piston 4 (or when the first cavity 3 is vented by the control unit 7) and prevents this pressure propagating to the second cavity 12 through the passage 8 and thereby interfering with the operation as described of the needle 11. Simply by operating the adjustment means 26 the constant value of the pressure in the accumulator 20 can be altered to suit the operating conditions of the machine 2. In particular, this makes it possible to adjust the pressure of the liquid in the second chamber 12 on the upstream side of the orifice(s) 17 while the machine is operating and depending on the gas pressure in the chamber 1 on the downstream side of said orifices 17 so as to maintain optimum conditions for atomization and entry of the injected liquid into the chamber 1.

It is stated above that the only source of pressurized liquid is the combination of the piston 4 and the cylinder 5. This does not exclude the presence of an auxiliary or so-called "supercharger" pump like that shown at 28 in FIG. 2 which is adapted to aspirate liquid in a storage tank 29 and to pressurize it at the suction inlet of the cylinder 5 at a pressure which is limited by a calibration device 30 and which has no effect on the operation of the injector device. Its role is to reduce the risk of cavitation and the formation of bubbles in the pressurized liquid circuit.

Figure 2:
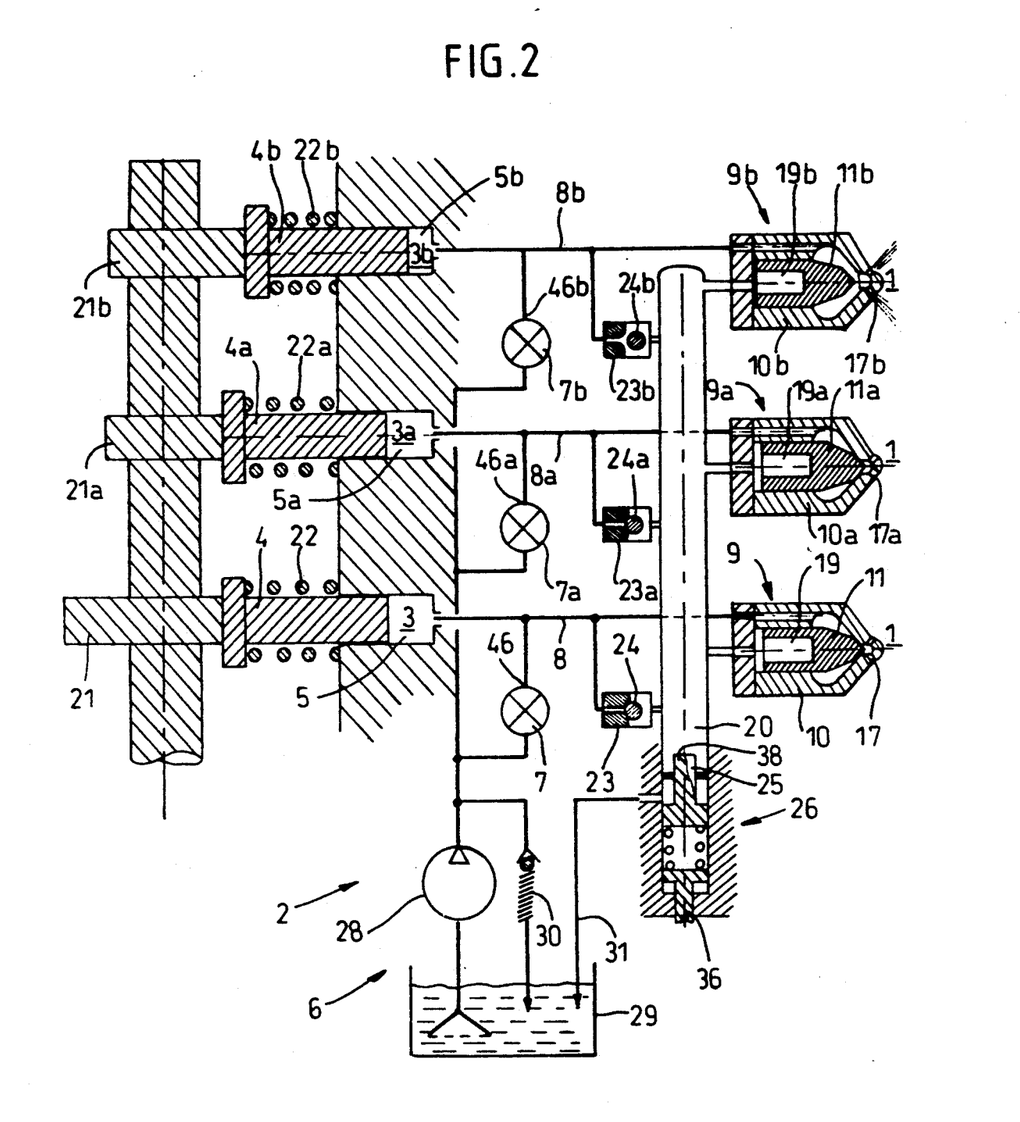
Figure 4:
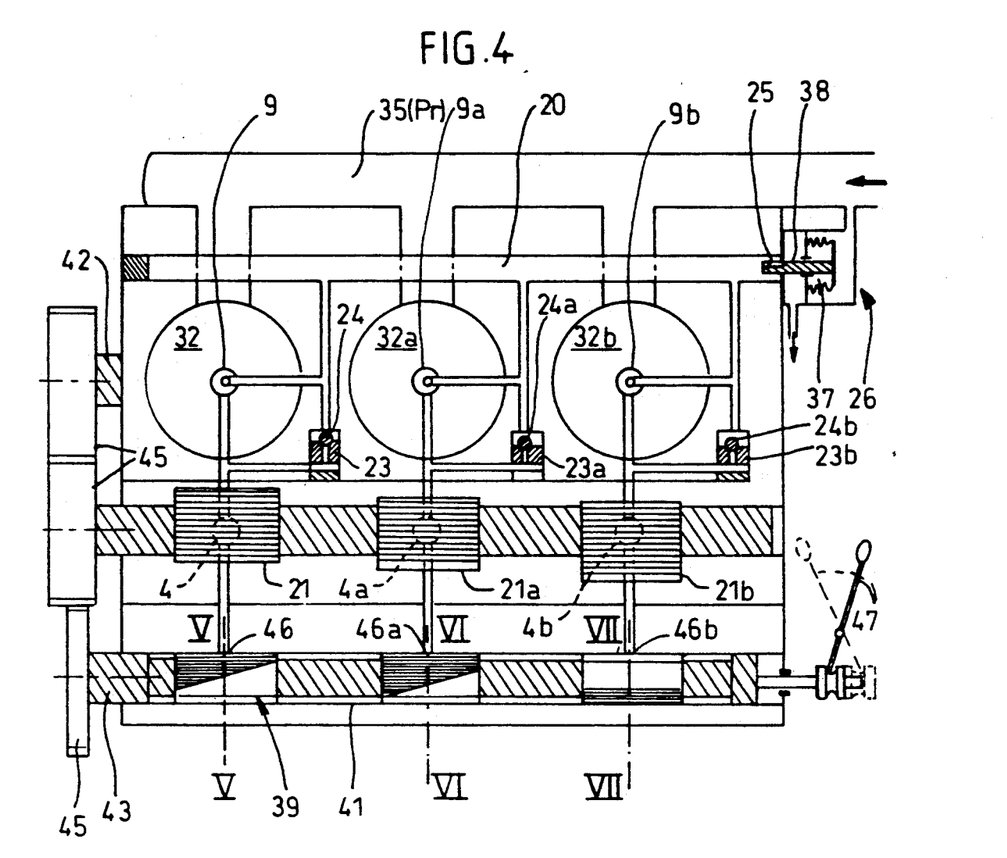
Figure 5:
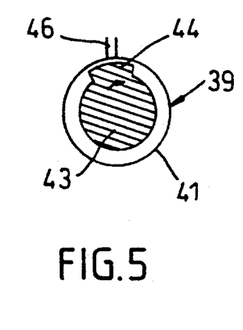
FIGS. 5, 6 and 7 are views in cross-section on the respective lines V—V, VI—VI and VII—VII in FIG. 4 showing the positions occupied simultaneously by rotating distributors.
Figure 6:
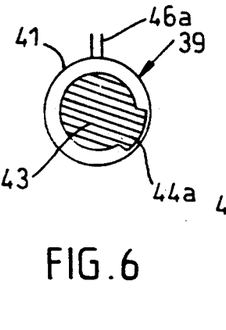
Figure 7:
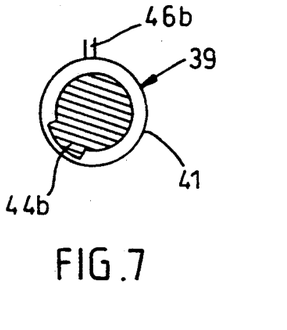

FIGS. 2 through 4 show a preferred application of the injector device in accordance with the invention. This device is designed to inject liquid fuel into the variable volume working chambers 1 of an internal combustion engine 2 comprising at least two such working chambers. By way of example, FIGS. 2 and 4 show an engine 2 comprising three working chambers 1, 1a and 1b which are each delimited within a cylinder 32, 32a, 32b by a piston 33 and a cylinder head 34 and supplied by respective injectors 9, 9a and 9b. The third cavity 19, 19a, 19b specific to the injector 9, 9a 9b of each of the working chambers 1, 1a, 1b communicates with a single accumulator 20 of pressurized liquid which communicates through a passage 31 with the low-pressure reserve means 6 (or preferably with the reservoir 29 thereof) through a single variable cross-section leakage orifice 25. The passages and communications between the first cavity 3, 3a, 3b specific to each injector 9, 9a, 9b and the respective injector, the control unit 7, 7a, 7b establishing cyclic communication with the low-pressure reserve means 6 and the calibrated orifice 23, 23a, 23b on and its one-way valve 24, 24a, 24b to the single accumulator 20 are as closely identical as possible for each injector 9, 9a, 9b.

The operating parameter to which said adjustment means 26 are responsive is advantageously the pressure Pr in the inlet manifold 35 of the engine 2, especially if the latter is an engine supercharged by a turbocharger driven by the engine exhaust gas.

Although FIG. 2 shows manually operated adjustment means 26 (the screw 36) it is preferable, as shown in FIG. 4, to employ automatic control using, for example, a bellows 37 whose outside surface is exposed to the pressure Pr in the inlet manifold 35 and which operates on a leakage adjuster unit 38.

Said control unit(s) 7, 7a, 7b establishing cyclic communication between the first cavity or cavities 3, 3a, 3b and the low-pressure fuel reserve means 6 are preferably provided by a rotating distributor 39 (see FIGS. 3 and 4) comprising a hollow cylindrical chamber 41 communicating with said low-pressure fuel reserve means 6 and into which discharge the communication(s) specific to the or each first cavity 3, 3a, 3b and inside which rotates, synchronously with the main crankshaft 42 of the engine 2, a shaft 43 comprising bearings and recesses and portions of circular cylindrical surface 44 whose outside diameter is equal, allowing for operating clearances, to the inside diameter of the chamber 41 and cooperating with the outlets 46, 46a, 46b of said communications so as to interrupt them cyclically for an angular duration which is the same for each injector 9, 9a, 9b and phased according to the order in which the cylinders 32, 32a, 32b of the engine 2 fire. The shaft 43 is driven by the main crankshaft 42 through gears 45 at the same angular speed as the main crankshaft if the engine 2 is a two-stroke engine or at half this speed if it is a four-stroke engine.

The angular duration of the interruption of said cyclic communication which is adjusted according to the increasing angular width in the axial direction of the shaft 43 of said cylindrical surface portions 44, 44a, 44b can be modified while the engine is operating by shifting the shaft 43 axially relative to the chamber 41. In FIG. 4 this axial shifting is caused by pivoting a lever 47 between the positions shown in full line and in dashed line. The phase of the interruption to said cyclic communication relative to the angular position of the main crankshaft 42 can be modified in operation using a known variable rotary drive mechanism for the shaft 43 (not shown).

Said adjustment means 26 are preferably adapted such that the pressure of the liquid in the accumulator 20 is such that the pressure of the liquid in the second cavity 12 when the needle 11 is lifted from its seat is at least three times the pressure in the pressurized chamber 1 at the time the liquid is injected. This optimizes the conditions under which the liquid injected into the pressurized chamber enters the chamber and is atomized.

By controlling the pressure of liquid in the accumulator 20 according to the pressure Pr of the air in the inlet manifold 35 of the engine, it is possible to vary the pressure of liquid in the second cavity 12 on the upstream side of the injection orifice(s) 17 in the same direction as the pressure in the working chambers 1 of the engine at the time the fuel is injected, given that this latter pressure depends on the engine inlet pressure Pr.

Figure 8:
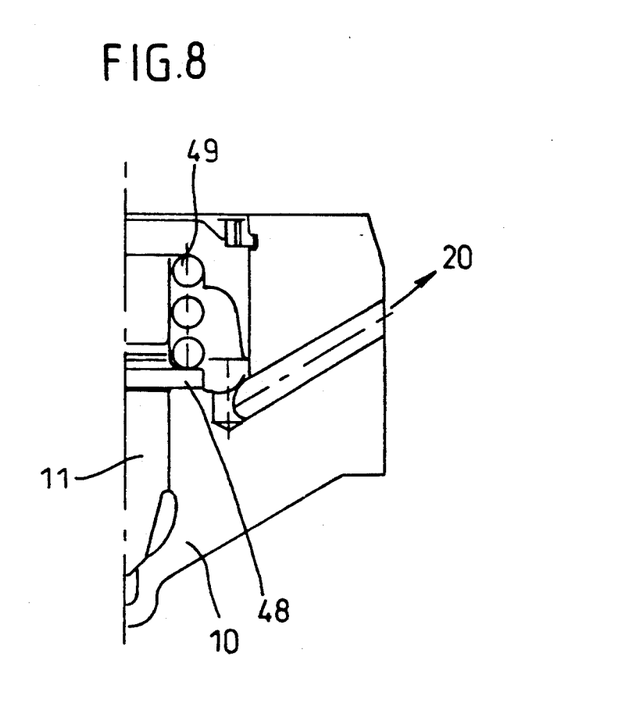
FIG. 8 is a half-view in axial cross-section to a larger scale showing part of the injector from FIG. 3.

These hydraulic return means for the needle 11 are extremely powerful and cause the needle to drop onto its seat very fast when the pressure in the first cavity 3 is discharged. This extremely rapid closing is highly favorable to reducing or eliminating unburnt products usually found in engines at the time the injection orifice(s) close. On the other hand, this high acceleration of the needle can lead to a strong impact of the needle on its seat 14, with the risk of damaging or breaking it. To avoid this problem it may be advantageous to provide the needle 11 with a hydraulic damper device. Referring to FIG. 8, to this end said needle 11 may comprise in its upper part a shoulder 48 adapted to cooperate with a shoulder at the upper end of the cylindrical wall 13 of the nozzle 10. The minimum distance between the shoulder 48 on the needle 11 and the shoulder on the nozzle 10 is positive and sufficiently small to cause throttling of the liquid between them and so damp the downward movement of the needle before it contacts the seat. To give a numerical example, a needle 11 having a diameter of 10 mm across its cylindrical part 15 could advantageously be damped by a shoulder 48 with a diameter of 20 mm approaching to within 0.02 mm the shoulder of the nozzle 10 when the needle 11 enters into contact with the seat 14. The hydraulic damper described with reference to FIG. 8 could of course be replaced by any equivalent hydraulic damper, preferably such that its operation is independent of the degree of longitudinal wear of the needle 11.

There is claimed:

1. Device for injecting liquid into at least one chamber pressurized by a gas and forming part of a periodic operation machine such as an internal combustion engine, the device comprising a unit for pressurizing the liquid to be injected formed by a variable volume first cavity delimited by a piston reciprocating inside a cylinder, which first cavity communicates with low-pressure liquid reserve means through the intermediary of a control unit establishing such communication cyclically in synchronism with the periodic operation of said machine and via a passage that is open at all times, except for the presence of a re-aspiration valve or like unit, with an injector formed by a nozzle and a mobile needle which is a body of revolution, which nozzle comprises a second cavity connected to said passage and delimited laterally by a circular cylindrical wall and axially by a partially conical wall forming a seat and coaxial with said cylindrical wall and at least one injector orifice discharging into said pressurized chamber, which needle has a cylindrical part forming a piston and adapted to slide with minimal operating clearance inside said cylindrical wall of said nozzle and a conical part cooperating with said seat, which needle is adapted to be held when idle in bearing engagement with said seat by return means so as to interrupt communication between said second cavity and said injector orifice(s) and so that its cross-section bearing on said seat, when projected onto a plane perpendicular to the axis of said needle, is less than the transverse cross-section of the cylindrical part of said needle forming said piston, the free surface of said cylindrical part of said needle forming said piston delimiting a variable volume third cavity which communicates with a pressurized accumulator of said liquid and thereby constitutes said return means, wherein said first cavity communicates with said third cavity through a calibrated orifice and a one-way valve connected in series and in that said accumulator communicates with said low-pressure liquid reserve mean through a variable cross-section leakage orifice provided with adjustment means adapted to maintain the pressure of the liquid in said accumulator at a substantially constant value for given operating conditions during periodic operation of said machine.

2. Injector device according to claim 1 wherein said adjustment means of said leakage orifice are responsive to at least one operating parameter of said machine and adapted to slave to this operating parameter the substantially constant pressure in said accumulator.

3. Injector device according to claim 2 wherein said operating parameter of said machine is a parameter conditioning the pressure in said pressurized chamber at the time said liquid is injected.

4. Injector device according to claim 1 employed to feed liquid fuel to the variable volume working chambers of an internal combustion engine comprising at least two working chambers wherein said third cavity specific to the injector of each working chamber communicates with a single pressurized liquid accumulator which communicates with said low-pressure liquid reserve means through a single variable cross-section leakage orifice and the passages and communications between said first cavity specific to each injector and the respective injector, said control unit establishing cyclic communication with said low-pressure liquid reserve means, said calibrated orifice and its one-way valve to said single accumulator are as closely identical as possible for each injector.

5. Fuel injector device according to claim 3 employed to feed liquid fuel to the variable volume working chambers of an internal combustion engine comprising at least two working chambers wherein said third cavity specific to the injector of each working chamber communicates with a single pressurized liquid accumulator which communicates with said low-pressure liquid reserve means through a single variable cross-section leakage orifice and the passages and communications between said first cavity specific to each injector and the respective injector, said control unit establishing cyclic communication with said low-pressure liquid reserve means, said calibrated orifice and its one-way valve to said single accumulator are as closely identical as possible for each injector and said operating parameter is the pressure in an inlet manifold of said engine.

6. Fuel injector device according to claim 4 wherein said control unit establishing cyclic communication between said first cavity or cavities and said low-pressure fuel reserve means is a rotary distributor comprising a hollow cylindrical chamber communicating with said low-pressure fuel reserve means into which discharge the communications specific to said first cavities and inside which rotates synchronously with the main crankshaft of the engine a shaft comprising bearings and recesses and circular cylindrical surface portions with an outside diameter excluding operating clearances equal to the inside diameter of said chamber and cooperating with the discharges of said communications so as to interrupt them cyclically for an identical duration for each injector phased according to the order in which the cylinders of said engine fire.

7. Fuel injector device according to claim 6 comprising means for adjusting during operation of the engine the angular duration of said cyclic communication according to the angular width of said cylindrical surface portions and operating by axial displacement of said shaft relative to said chamber.

8. Fuel injector device according to claim 7 comprising a variable rotary drive mechanism for said shaft adapted to modify in operation the phase of interruption of said cyclic communication relative to the main crankshaft of said engine.

9. Injector device according to claim 1 wherein at least one cylindrical injector orifice formed in said nozzle provides said communication between said second cavity and said pressurized chamber when said needle is separated from its seat.

10. Injector device according to claim 9 wherein said cylindrical injector orifice or each such orifice is formed in said nozzle on the downstream side of said seat of said needle.

11. Injector device according to claim 10 wherein said cylindrical injector orifice or each such orifice is formed in said nozzle on the conical bearing surface or seat on which said needle bears in the closed position.

12. Injector device according to claim 1 wherein said adjustment means are adapted to establish in said accumulator a pressure such that the pressure of liquid in said second cavity when said needle is separated from its seat is at least three times the pressure in said pressurized chamber at the time said liquid is injected.

13. Injector device according to claim 1 wherein said means for returning said needle to its seat further comprise a mechanical spring rated to enable operation of the injector device when said machine is started up at low frequency and the pressure of said liquid is not yet established in said accumulator.

14. Injector device according to claim 1 wherein said needle has a hydraulic damper operating preferably at the end of movement of said needle towards its seat.

15. Internal combustion engine with variable volume working chambers and featuring direct injection of liquid fuel into said chambers provided with a device for injecting liquid into at least one chamber pressurized by a gas and forming part of a periodic operation machine such as an internal combustion engine, the device comprising a unit for pressurizing the liquid to be injected formed by a variable volume first cavity delimited by a piston reciprocating inside a cylinder, which first cavity communicates with low-pressure liquid reserve means through the intermediary of a control unit establishing such communication cyclically in synchronism with the periodic operation of said machine and via a passage that is open at all times, except for the presence of a re-aspiration valve or like unit, with an injector formed by a nozzle and a mobile needle which is a body of revolution, which nozzle comprises a second cavity connected to said passage and delimited laterally by a circular cylindrical wall and axially by a partially conical wall forming a seat and coaxial with said cylindrical wall and at least one injector orifice discharging into said pressurized chamber, which needle has a cylindrical part forming a piston and adapted to slide with minimal operating clearance inside said cylindrical wall of said nozzle and a conical part cooperating with said seat, which needle is adapted to be held when idle in bearing engagement with said seat by return means so as to interrupt communication between said second cavity and said injector orifice(s) and so that its cross-section bearing on said seat, when projected onto a plane perpendicular to the axis of said needle, is less than the transverse cross-section of the cylindrical part of said needle forming said piston, the free surface of said cylindrical part of said needle forming said piston delimiting a variable volume third cavity which communicates with a pressurized accumulator of said liquid and thereby constitutes said return means, wherein said first cavity communicates with said third cavity through a calibrated orifice and a one-way valve connected in series and in that said accumulator communicates with said low-pressure liquid reserve means through a variable cross-section leakage orifice provided with adjustment means adapted to maintain the pressure of the liquid in said accumulator at a substantially constant value for given operating conditions during periodic operation of said machine.

16. Internal combustion engine according to claim 15 wherein said adjustment means of said leakage orifice are responsive to at least one operating parameter of said machine and adapted to slave to this operating parameter the substantially constant pressure in said accumulator.

17. Internal combustion engine according to claim 16 wherein said operating parameter of said machine is a parameter conditioning the pressure in said pressurized chamber at the time said liquid is injected.

18. Internal combustion engine according to claim 15 employed to feed liquid fuel to the variable volume working chambers of an internal combustion engine comprising at least two working chambers wherein said third cavity specific to the injector of each working chamber communicates with a single pressurized liquid accumulator which communicates with said low-pressure liquid reserve means through a single variable cross-section leakage orifice and the passages and communications between said first cavity specific to each injector and the respective injector, said control unit establishing cyclic communication with said low-pressure liquid reserve means, said calibrated orifice and its one-way valve to said single accumulator are as closely identical as possible for each injector.

19. Internal combustion engine according to claim 17 employed to feed liquid fuel to the variable volume working chambers of an internal combustion engine comprising at least two working chambers wherein said third cavity specific to the injector of each working chamber communicates with a single pressurized liquid accumulator which communicates with said low-pressure liquid reserve means through a single variable cross-section leakage orifice and the passages and communications between said first cavity specific to each injector and the respective injector, said control unit establishing cyclic communication with said low-pressure liquid reserve means, said calibrated orifice and its one-way valve to said single accumulator are as closely identical as possible for each injector and said operating parameter is the pressure in an inlet manifold of said engine.

20. Internal combustion engine according to claim 18 wherein said control unit establishing cyclic communication between said first cavity or cavities and said low-pressure fuel reserve means is a rotary distributor comprising a hollow cylindrical chamber communicating with said low-pressure fuel reserve means into which discharge the communications specific to said first cavities and inside which rotates synchronously with the main crankshaft of the engine a shaft comprising bearings and recesses and circular cylindrical surface portions with an outside diameter excluding operating clearances equal to the inside diameter of said chamber and cooperating with the discharges of said communications so as to interrupt them cyclically for an identical duration for each injector phased according to the order in which the cylinders of said engine fire.

21. Internal combustion engine according to claim 20 comprising means for adjusting during operation of the engine the angular duration of said cyclic communication according to the angular width of said cylindrical surface portions and operating by axial displacement of said shaft relative to said chamber.

22. Internal combustion engine according to claim 21 comprising a variable rotary drive mechanism for said shaft adapted to modify in operation the phase of interruption of said cyclic communication relative to the main crankshaft of said engine.

23. Internal combustion engine according to claim 15 wherein at least one cylindrical injector orifice formed in said nozzle provides said communication between said second cavity and said pressurized chamber when said needle is separated from its seat.

24. Internal combustion engine according to claim 23 wherein said cylindrical injector orifice or each such orifice is formed in said nozzle on the downstream side of said seat of said needle.

25. Internal combustion engine according to claim 24 wherein said cylindrical injector orifice or each such orifice is formed in said nozzle on the conical bearing surface or seat on which said needle bears in the closed position.

26. Internal combustion engine according to claim 15 wherein said adjustment means are adapted to establish in said accumulator a pressure such that the pressure of liquid in said second cavity when said needle is separated from its seat is at least three times the pressure in said pressurized chamber at the time said liquid is injected.

27. Internal combustion engine according to claim 15 wherein said means for returning said needle to its seat further comprise a mechanical spring rated to enable operation of the injector device when said machine is started up at low frequency and the pressure of said liquid is not yet established in said accumulator.

28. Internal combustion engine according to claim 15 wherein said needle has a hydraulic damper operating preferably at the end of movement of said needle towards its seat.

* * * * *